United States Patent [19]

Susperregui Asensio

[11] 3,979,875
[45] Sept. 14, 1976

[54] INTRODUCED IN SYSTEMS FOR COUPLING FURNITURE FORMING MODULES

[76] Inventor: Jose Gabriel Susperregui Asensio, Avda. del Generalisimo, 4 Irun-Guipuzcoa, Spain

[22] Filed: Apr. 18, 1974

[21] Appl. No.: 462,173

[30] Foreign Application Priority Data
Apr. 19, 1973  Spain .................................. 413916

[52] U.S. Cl. .............................. 52/753 D; 52/285
[51] Int. Cl.² .......................................... F16B 9/00
[58] Field of Search .............. 52/285, 284, 758 C, 52/753 D, 753 C, 584, 496, 758 H, 656, 476, 753 E, 753 F

[56] References Cited
UNITED STATES PATENTS

| | | | |
|---|---|---|---|
| 1,868,573 | 7/1932 | Herman | 52/753 D X |
| 2,208,159 | 7/1940 | Lichtor | 52/285 X |
| 3,370,871 | 2/1968 | Piarotto | 52/758 C X |
| 3,818,661 | 6/1974 | Pragg | 52/285 X |

FOREIGN PATENTS OR APPLICATIONS

| | | | |
|---|---|---|---|
| 1,028,791 | 3/1953 | France | 52/753 D |
| 654,809 | 6/1951 | United Kingdom | 52/753 D |

*Primary Examiner*—H. Hampton Hunter
*Attorney, Agent, or Firm*—Wenderoth, Lind & Ponack

[57] ABSTRACT

A system for coupling furniture forming modules includes three types of elements cooperating with the panels of the modules to be joined. Recessed holes complementary to one of the types of elements allow intermodular coupling. Two of the elements, independently of the number of modules to be joined, are repeated irrespective of such number of modules while the shape of the third element varies according to the number of modules to be joined.

9 Claims, 12 Drawing Figures

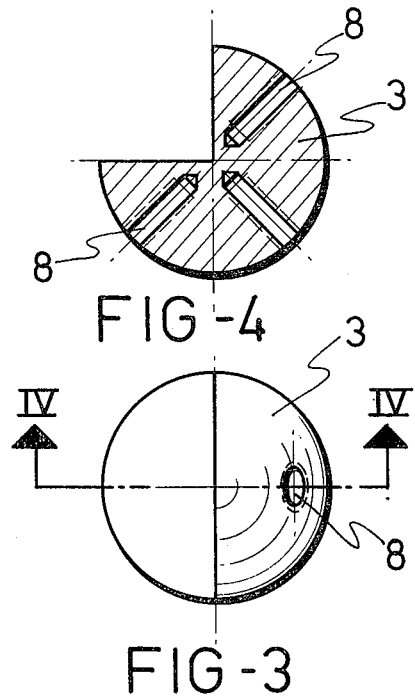
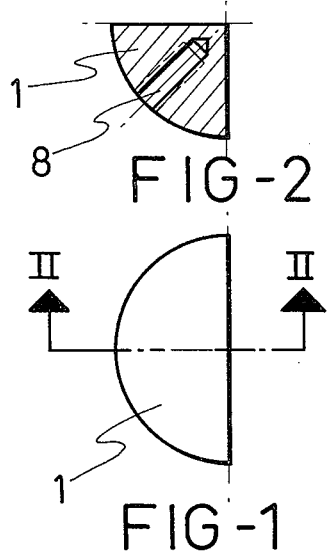
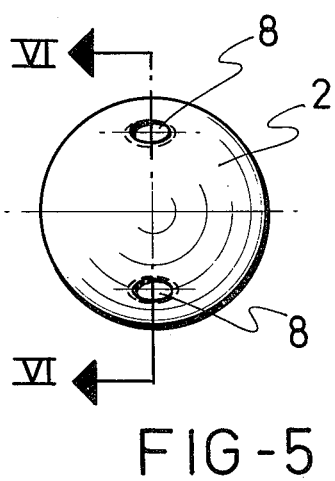
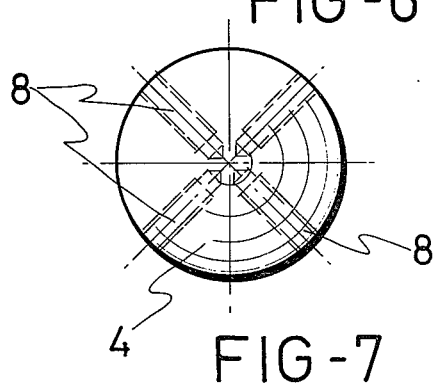

INTRODUCED IN SYSTEMS FOR COUPLING FURNITURE FORMING MODULES

BACKGROUND OF THE INVENTION

The present invention relates to improvements in systems for coupling furniture forming modules, and more particularly to a series of elements to be used to couple the panels which constitute each furniture forming module to be assembled.

SUMMARY OF THE INVENTION

The invention includes three types of elements, two of which are a screw and a prism-shaped element. The third element is a spherical component, at least a part of the surface of which has the form of a spherical portion.

The configuration of the particular spherical component used is formed by a number of integral spherical quarters equal to the number of modules to be assembled. That is, the spherical component is formed by from one to four integral spherical quarters, depending on whether panels from one to four furniture modules are to be coupled.

The spherical component is placed on the external portion of the panels forming the modules to be joined together. The prism-shaped element is placed on the internal surfaces of the corner of the panels. The screw extends through the prism-shaped element, through the panels to be joined, and into the spherical component.

Both the prism-shaped element and the spherical component are preferably made of a plastic material, such as nylon or the like. Each of the element and component will have at least one hole to receive the rod of the screw.

The panels of the furniture forming modules which are joined by the system of the invention are arranged at an angle of 90° and are bevelled to form miter-like joints. At the exterior of such joints, the panels have formed therein a spherical recess or cavity of a configuration such that the spherical component is completely received therein. The holes in the spherical component are threaded to receive the screws, thereby fixing the position of the prism-shaped element.

BRIEF DESCRIPTION OF THE DRAWINGS

The main features of the invention will be described in more detail below with reference to the attached drawings, wherein:

FIG. 1 is an elevational view of one of the spherical components of the invention, which element couples two panels of one furniture module at a right angle;

FIG. 2 is a section taken along lines II—II of FIG. 1;

FIG. 3 is an elevational view of a further spherical component used to couple module forming panels to join three modules together, two of which are superimposed while the third is adjacent to either of the superimposed modules;

FIG. 4 is a section taken along lines IV—IV of FIG. 3;

FIG. 5 is an elevational view of a further spherical component according to the invention, used to join two adjacent or superimposed modules;

FIG. 6 is a section taken along lines VI—VI of FIG. 5;

FIG. 7 is an elevation view of a fourth type of spherical component in the shape of a complete sphere used to join the panels of four modules;

DETAILED DESCRIPTION OF THE INVENTION

Figure 8:
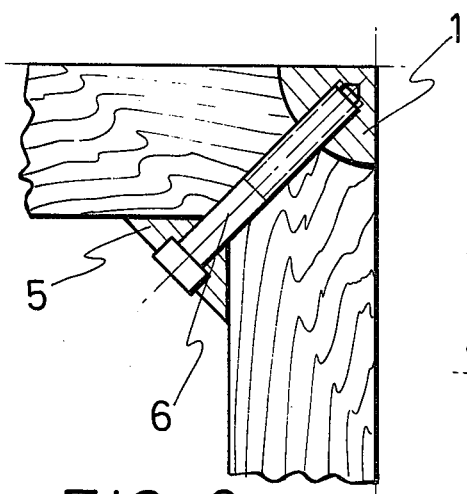
FIG. 8 is a partial section which partially illustrates two panels which form a module and which are joined by a spherical component such as that represented in FIGS. 1 and 2.

It can be seen from the drawings that the coupling device to join panels forming furniture modules, such as shelves, according to the invention includes three elements, one of which is a fastener such as a screw 6. A second element is a retaining member such as a prism-shaped element 5 having triangular ends. The third element is a spherical component having a configuration of from one to four integral spherical quarters, indicated in the drawings by 1, 2, 3 and 4, respectively. The number of integral spherical quarters of each spherical component is equal to the number of modules the panels of which are to be joined. The surface of each spherical component contacting module panels is spherical.

The spherical component 1 has a configuration equal to one wedge-shaped quarter of a sphere and has a suitably threaded recessed hole 8 from the spherical surface thereof extending toward the spherical center. It can be seen from FIG. 8, wherein two panels joined at a right angle and forming one corner of a module not joined to another module may be assembled and joined by the embodiment of the invention shown in FIGS. 1 and 2. Each panel of the module has therein a spherical recess or cavity of a configuration such that spherical component 1 is completely received in the recesses of the adjoining panels. The abutting edges of the panels are of course bevelled in a conventional manner. Holes are formed in the miter-like joint of the panels and in the prism-shaped element 5 to align with hole 8 in component 1. Prism-shaped element 5 is abutted against the inner panel surfaces, and screw 6 passes through the hole therein, the hole in the miter-like joint in the panels, and into the threaded hole 8 of component 1. Thus, tightening of screw 6 guarantees perfect joining and coupling of the panels forming the furniture module.

Figure 9:
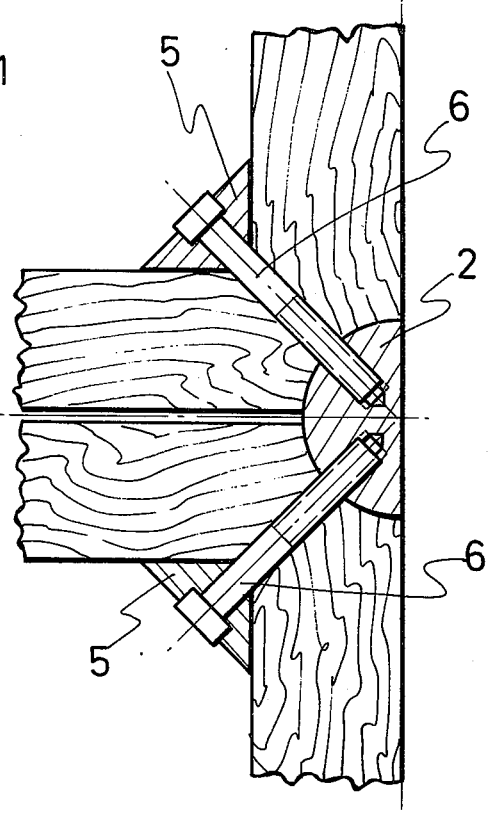
FIG. 9 is a partial sectional view of two superimposed modules which are joined by means of the spherical component illustrated in FIGS. 5 and 6.

FIG. 9 illustrates the way in which two superimposed furniture modules, each having joining mitered panels, are coupled by using the spherical component 2 shown in FIGS. 5 and 6. Each of the modules will have a polygon shape, and the panels thereof will be square or rectangular. The spherical component 2 is semi-spherical in shape and has a pair of threaded recessed holes 8, each of which is similar to the hole in component 1. It will be geometrically apparent that holes 8 in component 2 are offset from each other by 90°. The screws 6 extend through respective prism-shaped elements 5 located at the inner panel corners of each of the modules to be joined, through holes in the respective miter-like joints of abutting panels of the respective modules, and threaded into the respective holes 8 in component 2. Recessed cavities in the panels of the two modules connect to form a semi-spherical cavity of a configuration such that component 2 is completely received therein.

Figure 10:
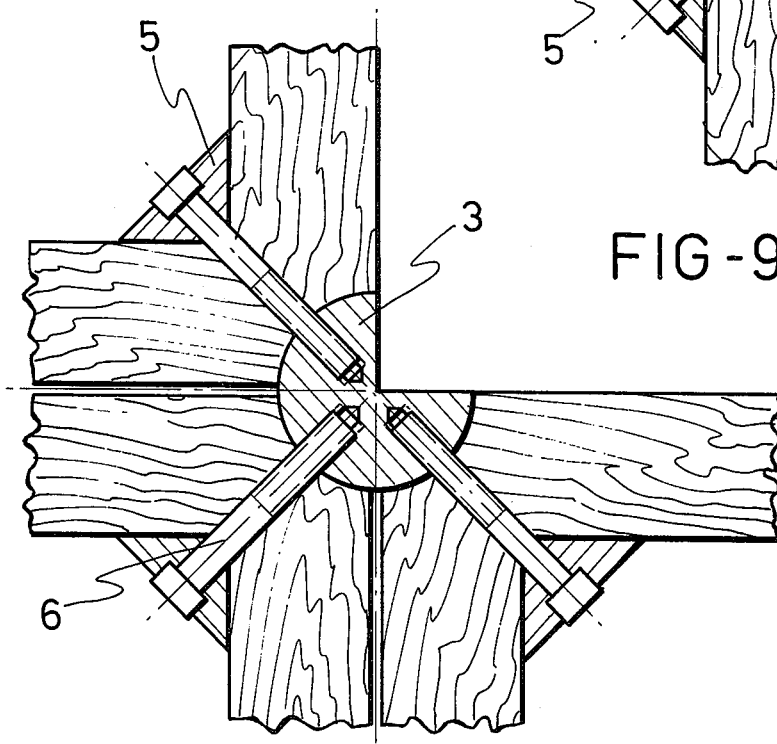
FIG. 10 is a partial cross-sectional view of three modules which are joined by means of the spherical element shown in FIGS. 3 and 4.

FIG. 10 illustrates the coupling of three adjacently positioned modules by means of the spherical component 3 shown in FIGS. 3 and 4. This embodiment is similar to those previously described except that component 3 has a configuration equal to three quarters of a sphere, and has therein three holes 8, which are employed with three screws 6 and three prism-shaped elements 5 to couple the three modules.

Figure 11:
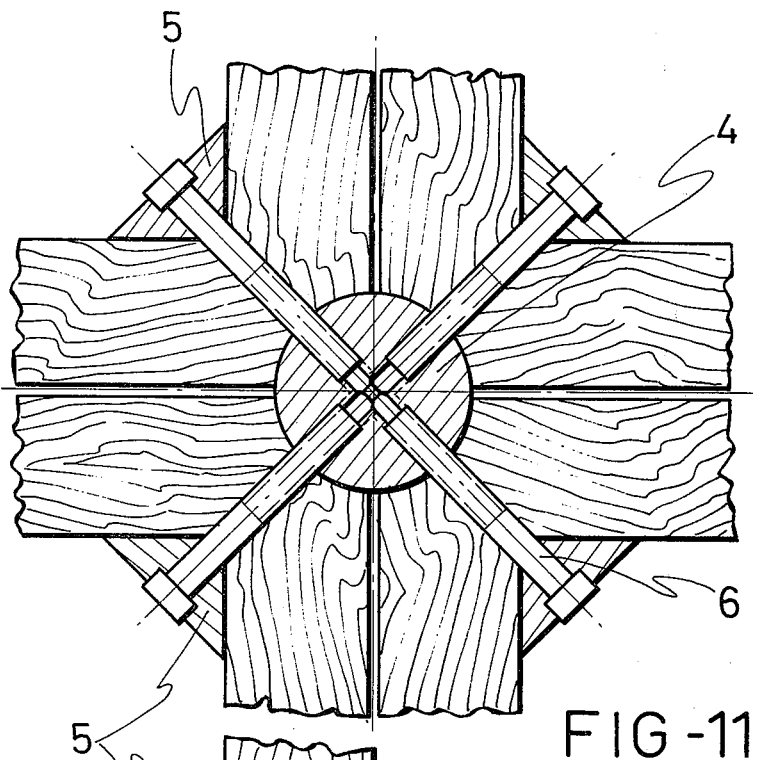
FIG. 11 is a partial sectional view of four modules joined by means of a spherical component such as that illustrated in FIG. 7.

FIG. 11 illustrates the coupling of four adjacently positioned modules by means of the spherical component 4 shown in FIG. 7. This embodiment is similar to those described above except that component 4 has the configuration of a complete sphere, and has therein four holes 8, which are employed with four screws 6 and four prism-shaped elements 5 to couple four modules.

It is to be understood that in the embodiments of FIGS. 10 and 11 all of the respective holes 8 are in the same plane and are respectively offset from each other by 90°.

Figure 12:
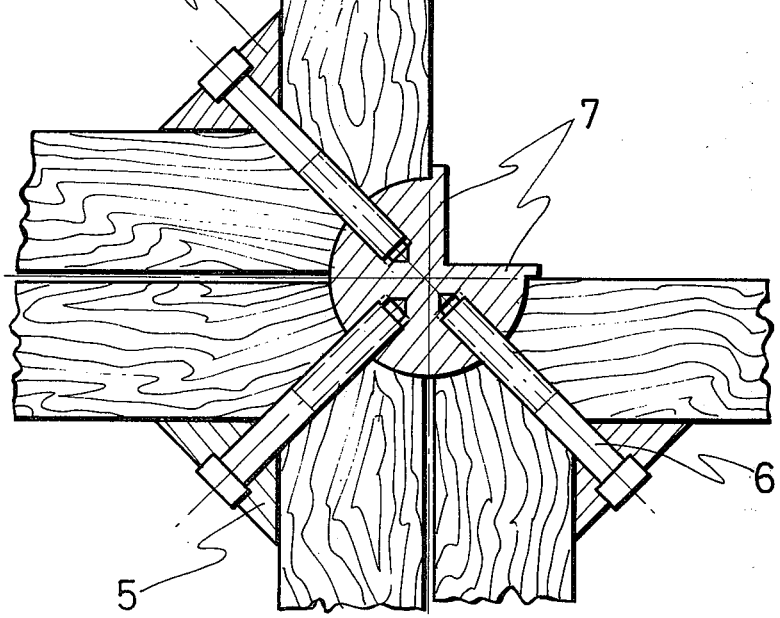
FIG. 12 is a partial section similar to FIG. 10, and applicable to any of the spherical components illustrated in FIGS. 1 to 6, but showing flanges or lips with which the flat surfaces of the spherical components may be provided.

Additionally, those spherical components having flat surfaces, i.e. components 1, 2 and 3, may be provided with lips or flanges 7 such as shown in FIG. 12, for appearance purposes.

It will be apparent that modifications may be made to the specific structure described above, without departing from the scope of the invention.

I claim:

1. A system for coupling together the panels of at least one furniture module of the type having rectangular panels joined along bevelled edges at a 90° angle to form a miter-like corner, said system comprising:
   a number, equal to the number of modules to be coupled, of retaining member means for contacting the inner surfaces of said module panels at said corner;
   a spherical component having a configuration formed by a number, equal to said number of modules to be coupled, of integral spherical quarters, said spherical component having a spherical surface for abutting complementary exterior surfaces of each of the module panels, at the respective miter-like corners thereof; and
   a number, equal to said number of modules to be coupled, of fastener means for extending through a respective said retaining member means, a respective miter-like corner, and into said spherical component, and for thereby coupling together said panels of said modules.

2. A system as claimed in claim 1, wherein said complementary exterior surfaces comprise surfaces of a spherical recess formed in said module panels at said miter-like corners thereof; and wherein said abutting surface of said spherical component comprises at least a partially spherical surface; said spherical recess in said module panels being of a configuration to completely receive therein said spherical surface of said spherical component.

3. A system as claimed in claim 2, wherein each of said retaining member means comprises a prism-shaped element having triangular ends.

4. A system as claimed in claim 3, wherein each said prism-shaped element and said miter-like corner have aligned holes extending therethrough; said spherical component has therein a number, equal to said number of modules to be coupled, of threaded holes therein, each aligning with aligned holes of a respective prism-shaped element and miter-like corner; and each said fastener means comprises a screw.

5. A system as claimed in claim 4, wherein said number of modules to be coupled comprises one module; and said spherical component has the configuration of a wedge-shaped one quarter of a sphere.

6. A system as claimed in claim 4, wherein said number of modules to be coupled comprises two modules; and said spherical component comprises a semi-spherical member.

7. A system as claimed in claim 4, wherein said number of modules to be coupled comprises three modules; and said spherical component has a configuration equal to three quarters of a sphere.

8. A system as claimed in claim 4, wherein said number of modules to be coupled comprises four modules; and said spherical component comprises a complete sphere.

9. A system as claimed in claim 2, wherein said spherical component has at least one planar surface joining said partially spherical surface thereof; and further comprising a flange extending annularly outwardly from the plane of each of said planar surfaces.

* * * * *